(12) United States Patent
Chung (10) Patent No.: US 7,671,572 B2
(45) Date of Patent: Mar. 2, 2010

(54) VOLTAGE BOOST CIRCUIT AND VOLTAGE BOOSTING METHOD USING VOLTAGE BOOST CLOCK SIGNAL WITH VARYING FREQUENCY

(75) Inventor: Kyu-young Chung, Seoul (KR)

(73) Assignee: Samsung Electronics Co. Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/697,383

(22) Filed: Apr. 6, 2007

(65) Prior Publication Data

US 2007/0236189 A1    Oct. 11, 2007

(30) Foreign Application Priority Data

Apr. 7, 2006    (KR) .................. 10-2006-0031928

(51) Int. Cl.
    *G05F 1/00*    (2006.01)
(52) U.S. Cl. .................. 323/283; 323/243; 323/284
(58) Field of Classification Search .................. 363/59; 323/259, 282–284, 344, 351, 243; 327/306, 327/589, 535
    See application file for complete search history.

(56) References Cited

U.S. PATENT DOCUMENTS 5,949,229 A * 9/1999 Choi et al. .................. 323/320

| 6,392,577 | B1 * | 5/2002 | Swanson et al. | ............ 341/144 |
| 6,734,655 | B1 * | 5/2004 | Javanifard et al. | ........... 323/222 |
| 7,274,116 | B2 * | 9/2007 | Inoue et al. | .................. 307/100 |
| 7,432,749 | B1 * | 10/2008 | Gehring et al. | ............. 327/156 |

FOREIGN PATENT DOCUMENTS

| JP | 2002-291231 | 10/2002 |
| JP | 2003-123495 | 4/2003 |
| KR | 100279077 B1 | 10/2000 |
| KR | 1020010006626 A | 1/2001 |
| KR | 1020010100772 A | 11/2001 |
| KR | 1020040065999 | 7/2004 |
| KR | 1020050065424 A | 6/2005 |

* cited by examiner

*Primary Examiner*—Jessica Han
*Assistant Examiner*—Emily Pham
(74) *Attorney, Agent, or Firm*—F. Chau & Associates, LLC (57) ABSTRACT

A voltage boost circuit and a method of boosting voltage using a voltage boost clock signal with varying frequency, in which the voltage boost circuit includes a boost voltage generator that responds to a voltage boost clock signal in order to boost an input voltage and outputs the boosted input voltage as an output boost voltage; and a boost voltage frequency control unit that responds to the result obtained by comparing a level of the output boost voltage and a level of a target boost voltage so as to change the boost voltage frequency of the voltage boost clock signal and outputs the voltage boost clock signal having the changed boost voltage frequency. The voltage boost circuit and the voltage boosting method can prevent a waste of the operating current during the boosting of the voltage.

12 Claims, 4 Drawing Sheets

VOLTAGE BOOST CIRCUIT AND VOLTAGE BOOSTING METHOD USING VOLTAGE BOOST CLOCK SIGNAL WITH VARYING FREQUENCY

CROSS-REFERENCE TO RELATED PATENT APPLICATION

This application claims the benefit of Korean Patent Application No. 10-2006-0031928, filed on Apr. 7, 2006, in the Korean Intellectual Property Office, the disclosure of which is incorporated herein in its entirety by reference.

BACKGROUND OF THE INVENTION

1. Technical Field

The present disclosure relates to a voltage boost circuit and a method of boosting voltage and, more particularly, to a voltage boost circuit and a method of boosting voltage using a voltage boost clock signal with varying frequency.

2. Discussion of Related Art

A voltage boosting circuit is a circuit that increases a voltage level of a received input voltage and outputs the increased voltage.

The level of boost voltage output by a general voltage boost circuit is proportional to a boost voltage frequency of a voltage boost clock signal and the amount of operational current of the voltage boost clock signal. In addition, the amount of load current flowing in a general voltage boost circuit is inversely proportional to the level of the boost voltage. Meanwhile, the amount of load current flowing in a general voltage boost circuit varies according to various conditions. In this case, in order for the voltage boost circuit to stably output a boost voltage over a predetermined target voltage, the voltage boost circuit should be able to output a boost voltage to the extent of the target voltage under a condition that the load current is at a maximum.

The boost voltage frequency of the voltage boost clock signal, however, is fixed in the voltage boost circuit. Therefore, in order for the voltage boost circuit to output boost voltage to the extent of the target voltage even under the condition that the load current is at a maximum, the voltage boost circuit fixes and outputs the highest boost voltage frequency that corresponds to the condition. Meanwhile, as described above, the amount of operational current of the voltage boost circuit is proportional to the boost voltage frequency. Therefore, under a condition other than the condition where the load current is at a maximum, the operational current of the voltage boost circuit may flow excessively.

SUMMARY OF THE INVENTION

Exemplary embodiments of the present invention provide a voltage boost circuit to boost voltage using a voltage boost clock signal with a varying boost voltage frequency.

Exemplary embodiments of the present invention also provide a method of boosting voltage using a voltage boost clock signal with a varying boost voltage frequency.

According to an exemplary embodiment of the present invention, there is provided a voltage boost circuit including: a boost voltage generator that responds to a voltage boost clock signal in order to boost the input voltage and outputs the boosted input voltage as an output boost voltage; and a boost voltage frequency control unit that responds to the result obtained by comparing a level of the output boost voltage and a level of a target boost voltage in order to change the boost voltage frequency of the voltage boost clock signal and outputs the voltage boost clock signal having the changed boosting voltage frequency.

The boost voltage frequency control unit may include: a comparison unit that compares the levels of the output boost voltage and the target boost voltage and outputs the comparison result; and a voltage boost clock signal output unit that increases or decreases the boost voltage frequency of the voltage boost clock signal according to the result obtained by counting the comparison result.

The voltage boost clock signal output unit may include: an up/down counter that counts the comparison result and outputs the counted result as a boost voltage frequency selection signal; and a voltage boost clock signal generator that outputs the voltage boost clock signal having the boost voltage frequency that corresponds to the boost voltage frequency selection signal.

When the output boost voltage is lower than the target boost voltage, the comparison unit may output an up signal as the comparison result, and when the output boosting voltage is higher than the target boost voltage, the comparison unit may output a down signal as the comparison result, and wherein the up/down counter responds to the up signal and the down signal, respectively, in order to respectively increase and decrease the boost voltage frequency selection signal and outputs the increased and decreased boost voltage frequency selection signal.

The voltage boost circuit may further include a voltage distributor that distributes the output boost voltage according to a predetermined proportion and outputs the distributed output boost voltage.

According to an exemplary embodiment of the present invention, there is provided a voltage boost circuit including: a voltage boost unit that boosts the input voltage using a voltage boost clock signal having a boost voltage frequency that corresponds to a boost voltage frequency selection signal and outputs the input voltage as an output boost voltage; and a voltage boost control unit that responds to the result obtained by comparing levels of the output boost voltage and the target boost voltage and changes the boost voltage frequency selection signal to output the changed boost voltage frequency selection signal.

The voltage boost control unit may include: a comparison unit that compares the levels of the output boost voltage and the target boost voltage and outputs the comparison result; and an up/down counter that increases or decreases the boost voltage frequency selection signal according to the comparison result and outputs the increased or decreased boost voltage frequency selection signal.

The voltage boost unit may include: a voltage boost clock signal generator that outputs the voltage boost clock signal having the boost voltage frequency that corresponds to the boost voltage frequency selection signal; and a boost voltage generator that responds to the voltage boost clock signal and boosts the input voltage in order to output the input voltage as the output boost voltage.

According to an exemplary embodiment of the present invention, there is provided a method of boosting voltage including: generating a boost voltage by boosting the input voltage so as to output the input voltage as an output boost voltage in response to the voltage boost clock signal; and changing the boost voltage frequency of the voltage boost clock signal in response to the result obtained by comparing levels of the output boost voltage and target boost voltage and controlling the boost voltage frequency in order to output the voltage boost clock signal having the changed boost voltage frequency.

The controlling of the boost voltage frequency include: comparing the levels of the output boost voltage and the target boost voltage and outputting the comparison result; up/down counting that counts the comparison result and outputs the counted result as the boost voltage frequency selection signal; and generating the boost voltage clock signal to output the voltage boost clock signal having the boost voltage frequency that corresponds to the boost voltage frequency selection signal.

BRIEF DESCRIPTION OF THE DRAWINGS

Exemplary embodiments of the present invention will be understood in more detail from the following descriptions taken in conjunction with the attached drawings, in which.

DETAILED DESCRIPTION OF EXEMPLARY EMBODIMENTS

Hereinafter, exemplary embodiments of the present invention will be described more fully with reference to the accompanying drawings, in which exemplary embodiments of the invention are shown.

Figure 1:
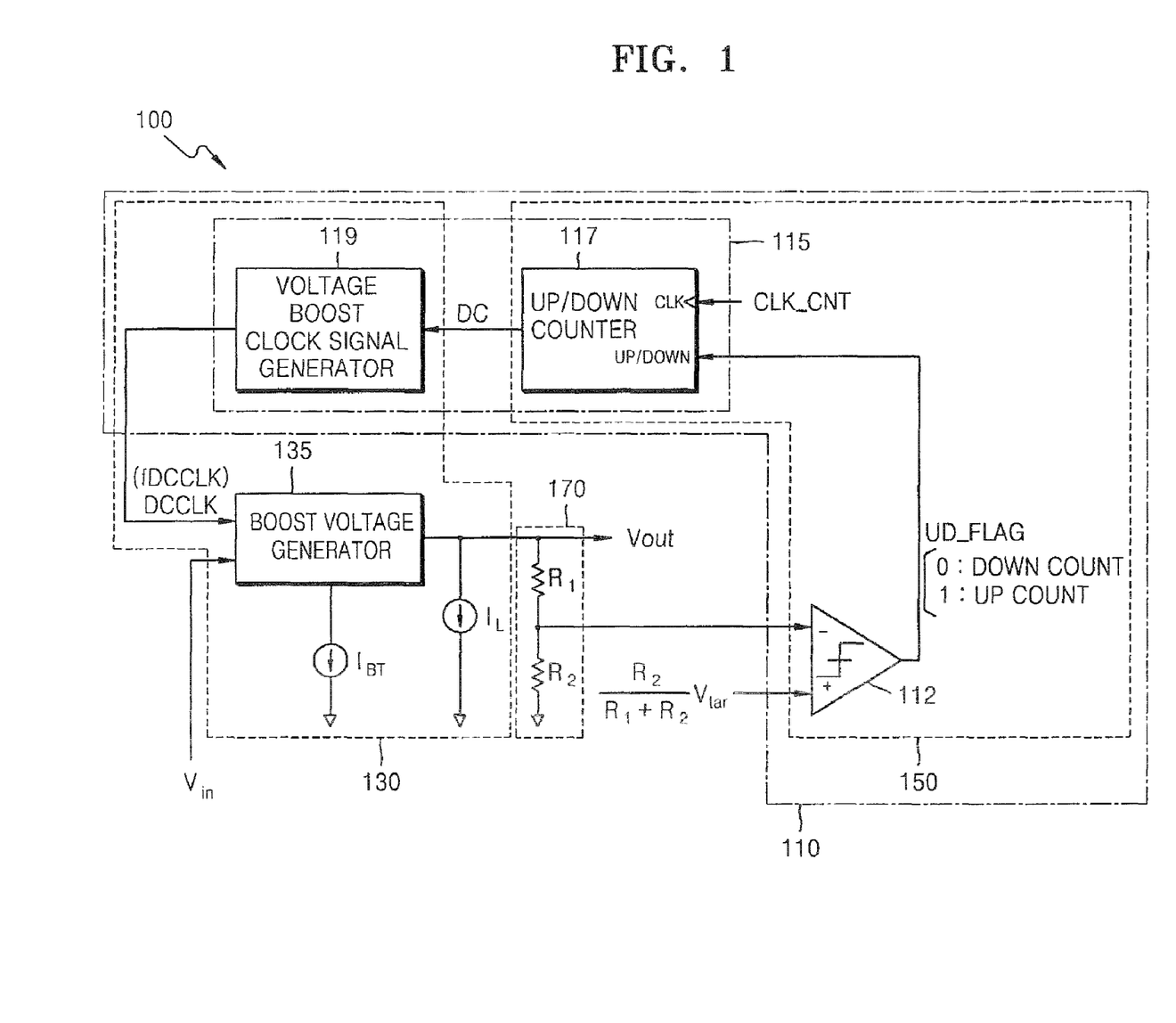
FIG. 1 is a block diagram of a voltage boost circuit that boosts voltage using a voltage boost clock signal with varying boost voltage frequency, according to an exemplary embodiment of the present invention.

FIG. 1 is a block diagram of a voltage boost circuit 100 that boosts voltage using a voltage boost clock signal with varying frequency, according to an exemplary embodiment of the present invention.

Referring to FIG. 1, the voltage boost circuit 100 includes a boost voltage generator 135 and a boost voltage frequency control unit 110. The boost voltage generator 135 responds to a voltage boost clock signal DCCLK in order to boost the input voltage VIN and outputs the boosted input voltage as an output boost voltage VOUT. The boost voltage frequency control unit 110 responds to the result UP/DOWN obtained by comparing the level of the output boost voltage VOUT and the level of a target boost voltage VTAR in order to change a boost voltage frequency fDCCLK of the voltage boost clock signal DCCLK, and outputs the voltage boost clock signal DCCLK having a changed boost voltage frequency fDCCLK.

The boost voltage frequency control unit 110 may include a comparison unit 112 and a voltage boost clock signal output unit 115. The comparison unit 112 generally compares the levels of the output boosting voltage VOUT and the target boosting voltage VTAR obtained from voltage dividing resistors R1 and R2 that will be described hereinbelow and outputs the comparison result UP/DOWN. The voltage boost clock signal output unit 115 increases or decreases the boost voltage frequency fDCCLK of the voltage boost clock signal DCCLK according to the result obtained by counting the comparison result UP/DOWN outputted by the comparison unit 112. The voltage boost clock signal output unit 115 may include an up/down counter 117 and a voltage boost clock signal generator 119. The up/down counter 117 counts the comparison result UP/DOWN outputted by the comparison unit 112 and outputs the counted result as a boost voltage frequency selection signal DC. The voltage boost clock signal generator 119 outputs the voltage boost clock signal DCCLK having the boost voltage frequency fDCCLK that corresponds to the boost voltage frequency selection signal DC.

Figure 2:
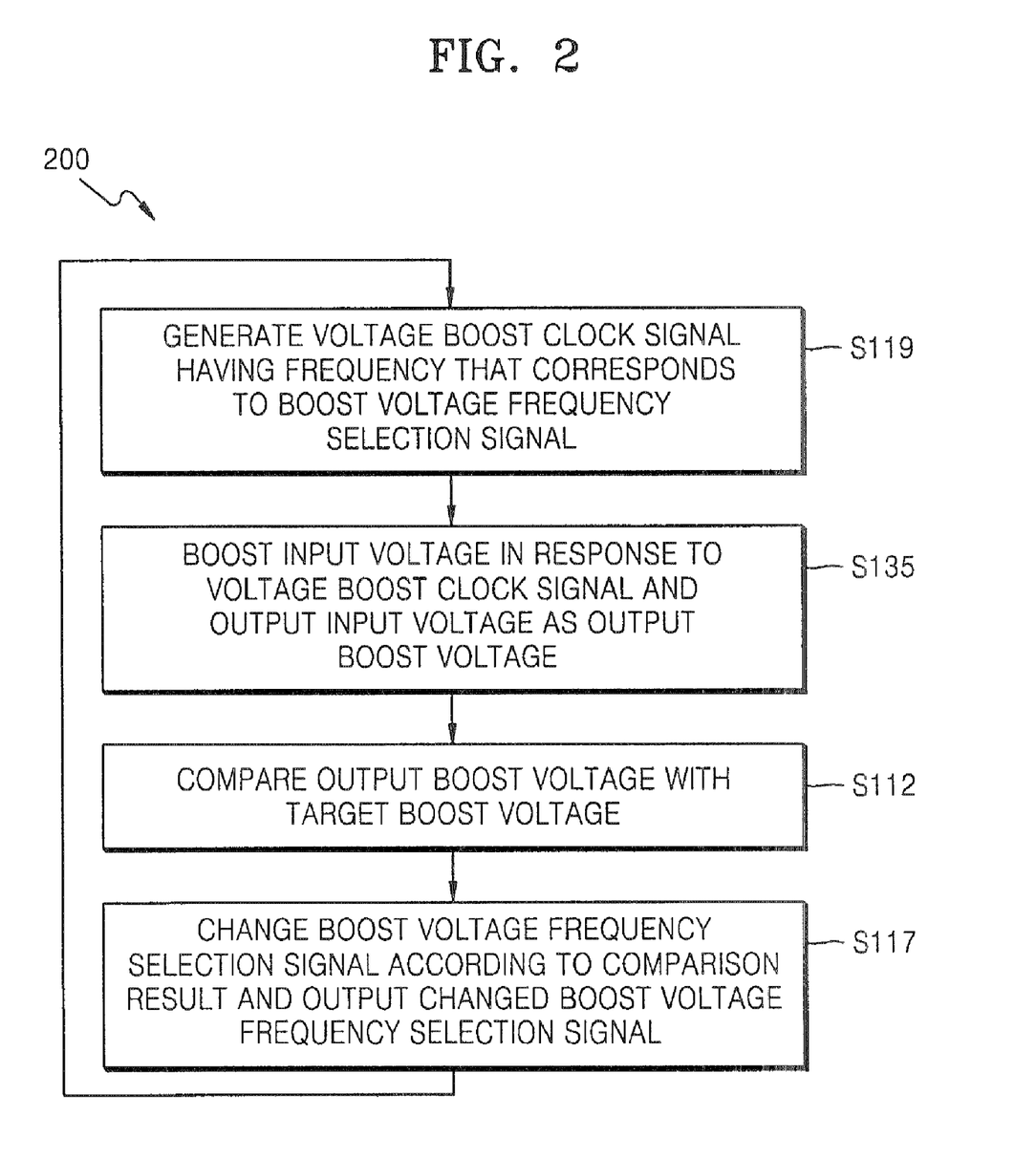
FIG. 2 is a flowchart illustrating an operation of the voltage boost circuit of FIG. 1.

FIG. 2 is a flowchart illustrating an operation of the voltage boost circuit 100 illustrated in FIG. 1.

Hereinafter, the operation of the voltage boost circuit 100 according to an exemplary embodiment of the present invention will be described with reference to FIGS. 1 and 2.

If the output boost voltage VOUT of the boost voltage generator 135 is lower than the target boost voltage VTAR, the comparison unit 112 outputs an UP signal (operation S112).

The up/down counter 117 receives the UP signal and performs an up counting operation. As a result the up counting operation, the up/down counter 117 increases and outputs the boost voltage frequency selection signal DC (operation S117).

The voltage boost clock signal generator 119 receives the increased boost voltage frequency selection signal DC and outputs the voltage boost clock signal DCCLK having the boost voltage frequency fDCCLK that corresponds to the boost voltage frequency selection signal DC. In other words, the voltage boost clock signal generator 119 increases the boost voltage frequency fDCCLK of the voltage boost clock signal DCCLK by as much as the boost voltage frequency selection signal DC increases and outputs the voltage boost clock signal DCCLK having the increased boost voltage frequency fDCCLK (operation S119).

The boost voltage generator 135 boosts input voltage VIN using the voltage boost clock signal DCCLK having the increased boost voltage frequency fDCCLK and outputs the input voltage VIN as the output boost voltage VOUT. In other words, the boost voltage generator 135 generates the output boost voltage VOUT that is proportional to the boost voltage frequency fDCCLK. Therefore, in response to the increase of the boost voltage frequency fDCCLK, the output boost voltage VOUT also increases (operation S135).

The increased output boost voltage VOUT is inputted again to the comparison unit 112 and is compared again with the target boost voltage VTAR (operation S112). The operations S112, S117, S119, and S135 are repeatedly performed until the boost voltage VOUT is the same as the target boost voltage VTAR, or the difference between the output boost voltage VOUT and the target boosting voltage VTAR is in a fixed range.

Meanwhile, when the output boost voltage VOUT of the boost voltage generator 135 is higher than the target boost voltage VTAR, the comparison unit 112 outputs a DOWN signal (operation S112).

The up/down counter 117 receives the DOWN signal and performs a down counting operation. As a result of the down counting, the up/down counter 117 reduces and outputs the boost voltage frequency selection signal DC (operation S117).

The voltage boost clock signal generator 119 receives the decreased boost voltage frequency selection signal DC and outputs the voltage boost clock signal DCCLK having the boost voltage frequency fDCCLK that corresponds to the boost voltage frequency selection signal DC. In other words, the voltage boost clock signal generator 119 decreases the boost voltage frequency fDCCLK of the voltage boost clock signal DCCLK by as much as the boost voltage frequency selection signal DC decreases and outputs the voltage boost clock signal DCCLK having the decreased boost voltage frequency fDCCLK (operation S119).

The boost voltage generator 135 boosts input voltage VIN using the voltage boost clock signal DCCLK having the decreased boost voltage frequency fDCCLK and outputs the input voltage VIN as output boost voltage VOUT. In other words, the boost voltage generator 135 generates the output boost voltage VOUT that is proportional to the boost voltage frequency fDCCLK.

Therefore, in response to the decrease of the boost voltage frequency fDCCLK, the output boost voltage VOUT also decreases (operation S135).

The decreased output boost voltage VOUT is inputted again to the comparison unit 112 and is compared again with the target boost voltage VTAR (operation S112). The operations S112, S117, S119, and S135 are repeatedly performed until the boost voltage VOUT is the same as the target boost voltage VTAR, or the difference between the output boost voltage VOUT and the target boost voltage VTAR is in a fixed range.

Figure 3A:
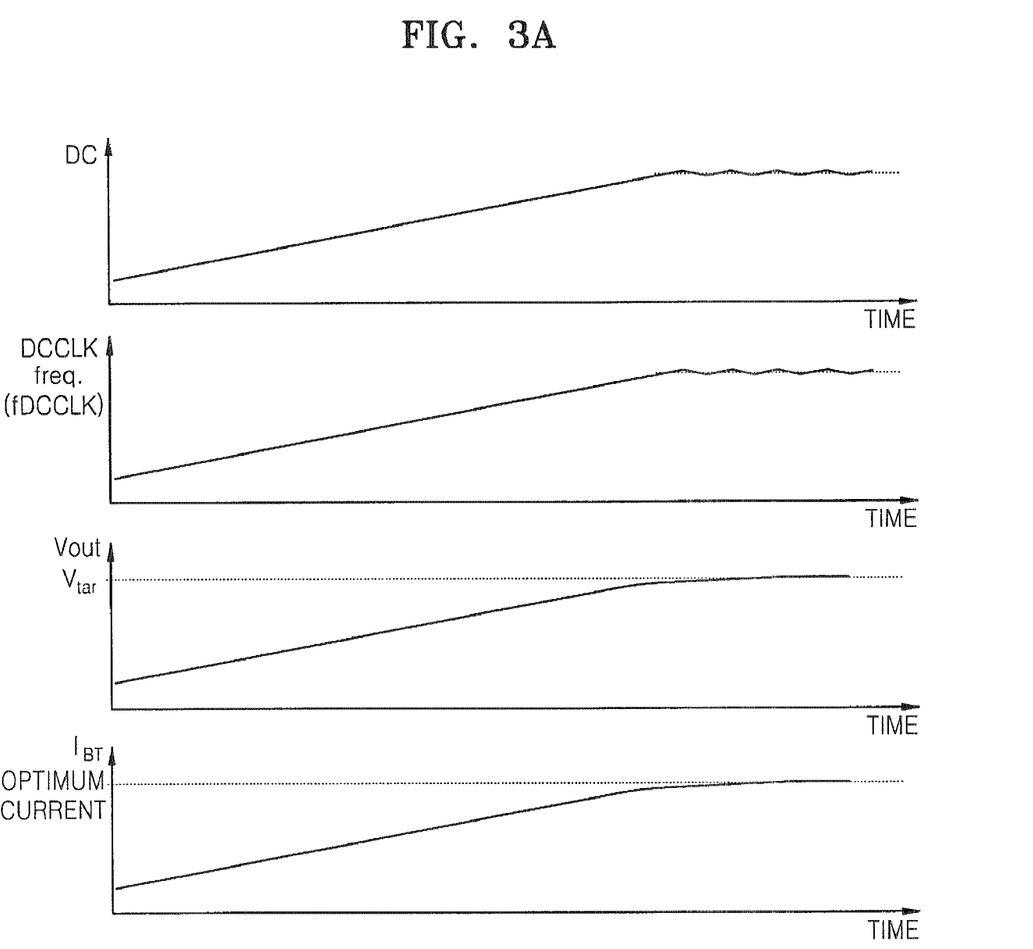
FIG. 3A is a graph showing changes of various kinds of signals in the voltage boost circuit illustrated in FIG. 1, when an output boost voltage is lower than a target boost voltage.

FIG. 3A is a graph showing changes of various kinds of signals in the voltage boost circuit 100 illustrated in FIG. 1, when the output boosting voltage VOUT is lower than the target boost voltage VTAR.

Referring to FIG. 3A, as the boost voltage frequency selection signal DC increases, the boost voltage frequency fDCCLK of the voltage boost clock signal DCCLK also increases. In addition, as the boost voltage frequency fDCCLK increases, the output boost voltage VOUT gradually increases and the amount of operating current $I_{BT}$ of the voltage boost circuit 100 illustrated in FIG. 1 gradually increases. Next, when the output boost voltage VOUT reaches the target boosting voltage VTAR, the voltage boost circuit 100 illustrated in FIG. 1 does not raise the boost voltage frequency selection signal DC any more. Accordingly, the boost voltage frequency fDCCLK of the voltage boost clock signal DCCLK does not increase any more and the amount of operating current $I_{BT}$ of the voltage boost circuit 100 illustrated in FIG. 1 is maintained.

Figure 3B:
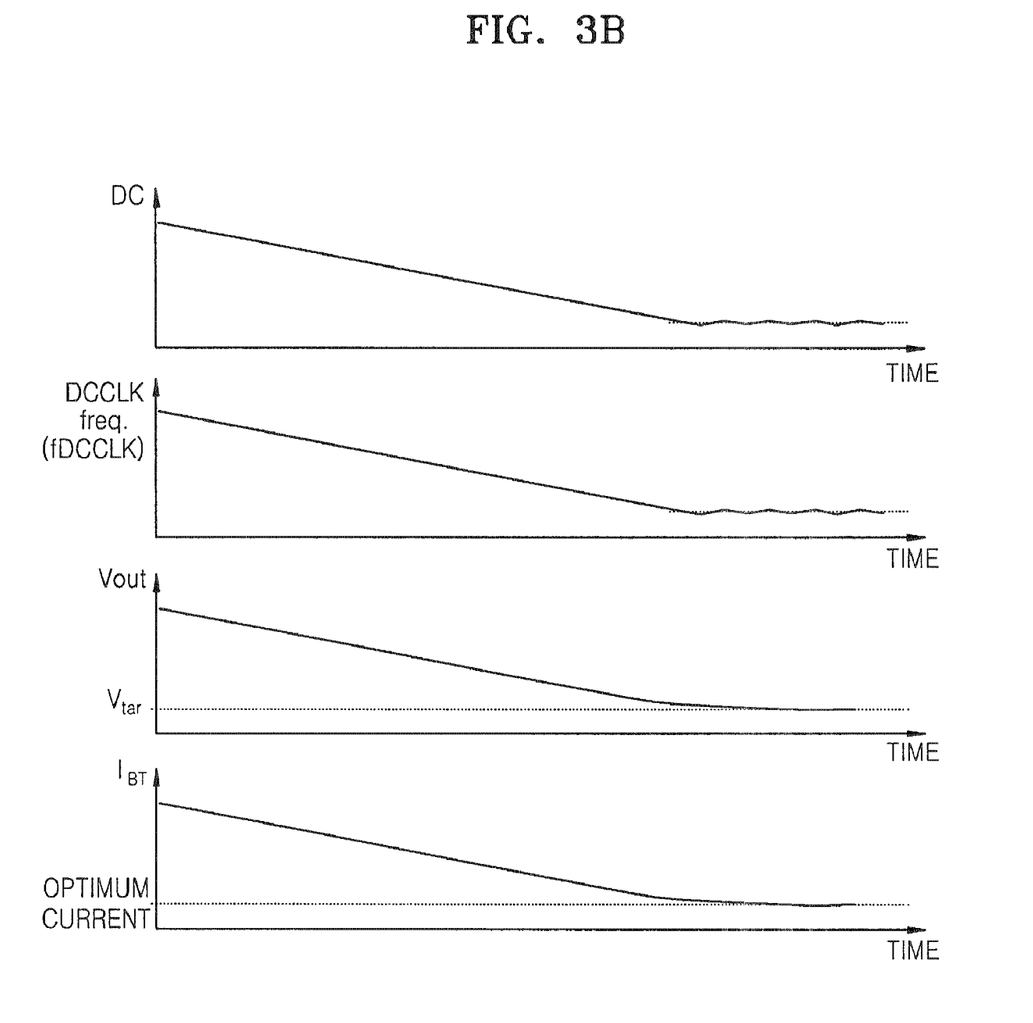
FIG. 3B is a graph showing changes of various kinds of signals in the voltage boost circuit illustrated in FIG. 1, when an output boost voltage is higher than a target boost voltage.

FIG. 3B is a graph showing changes of various kinds of signals in the voltage boost circuit 100 illustrated in FIG. 1, when the output boost voltage VOUT is higher than the target boost voltage VTAR.

Referring to FIG. 3B, as the boost voltage frequency selection signal DC decreases, the boosting voltage frequency fDCCLK of the voltage boost clock signal DCCLK also decreases. In addition, as the boost voltage frequency fDCCLK decreases, the output boost voltage VOUT gradually decreases and the amount of operating current $I_{BT}$ of the voltage boost circuit 100 illustrated in FIG. 1 gradually decreases. Next, when the output boost voltage VOUT reaches the target boost voltage VTAR, the voltage boost circuit 100 illustrated in FIG. 1 does not decrease the boost voltage frequency selection signal DC any more. Accordingly, the boost voltage frequency fDCCLK of the voltage boost clock signal DCCLK does not decrease any more and the amount of operating current $I_{BT}$ of the voltage boost circuit 100 illustrated in FIG. 1 is maintained.

Under the condition that the output boost voltage VOUT is the same as the target boost voltage VTAR, if an amount of load current $I_L$ flowing in the voltage boost circuit 100 increases or decreases, the output boost voltage VOUT of the voltage boost circuit 100 decreases or increases. In this case, the voltage boost circuit 100 increases or decreases the boost voltage frequency fDCCLK and thus the output boost voltage VOUT increases or decreases. In addition, the voltage boost circuit 100 repeatedly performs an operation of increasing or decreasing according to the boost voltage frequency fDCCLK until the output boost voltage VOUT is the same as the target boost voltage VTAR.

In other words, the voltage boost circuit 100 can vary the boost voltage frequency fDCCLK according to a change of an amount of load current $I_L$. Accordingly, the voltage boost circuit 100 according to an exemplary embodiment of the present invention outputs the output boost voltage VOUT that is the same as the target boost voltage VTAR regardless of changes in the amount of load current $I_L$ and prevents wasting the amount of operating current $I_{BT}$. On the other hand, a general voltage boost circuit fixes and outputs the highest boost voltage that corresponds to the condition that the amount of load current $I_L$ is at a maximum. Therefore, under any other condition, except for the condition that an amount of load current $I_L$ is at a maximum, the operating current of the voltage boost circuit excessively flows.

Referring back to FIG. 1, the voltage boost circuit 100 according to an exemplary embodiment of the present invention may further include a voltage distributor 170. The voltage distributor 170 distributes the output boost voltage VOUT according to a predetermined proportion of R2/(R1+R2) and outputs the distributed output boosting voltage R2/(R1+R2)*VOUT. In this case, the target boost voltage VTAR is distributed according to a predetermined proportion of R2/(R1+R2) by the voltage divider so as to obtain distributed target boosting voltage R2/(R1+R2)*VTAR. The distributed target boost voltage R2/(R1+R2)*VTAR is compared with the distributed output boost voltage R2/(R1+R2)*VOUT. The boost voltage frequency control unit 110 responds to the comparison result UP/DOWN and changes the boost voltage frequency fDCCLK of the voltage boost clock signal DCCLK.

More specifically, the voltage distributor 170 outputs the distributed output boost voltage R2/(R1+R2)*VOUT to the comparison until 112. The distributed output boost voltage R2/(R1+R2)*VOUT is a voltage that distributes the output boost voltage VOUT according to a predetermined proportion of R2/(R1+R2) by the voltage divider R1 and R2. The comparison unit 112 compares the distributed output boost voltage R2/(R1+R2)*VOUT with voltage R2/(R1+R2)*VTAR obtained by distributing an externally applied target boost voltage VTAR according to a predetermined proportion of R2/(R1+R2).

In this case, the comparison operation is performed by using voltages lower than the voltage level of the output boost voltage VOUT and the target boost voltage VTAR. Meanwhile, the voltage boost circuit is generally used to supply a high voltage to a device that is hardly ever supplied with high voltage (for example, a semiconductor memory device that should be operated at a low voltage). In other words, the voltage boost circuit is generally used to generate a high voltage using a low voltage in a situation in which a high voltage cannot be supplied. Therefore, if the comparison operation is performed by lowering the voltage level of the output boost voltage VOUT and the target boost voltage VTAR through the voltage distributor 170, the voltage boost circuit 100 according to an exemplary embodiment of the present invention is supplied with a low level voltage R2/(R1+R2)*VTAR, instead of the high level target boost voltage VTAR, and can perform not only the comparison operation, but also a voltage boosting operation.

The voltage boost circuit 100 according to an exemplary embodiment of the present invention includes a voltage boost unit 130 and a voltage boost control unit 150. The voltage boost unit 130 boosts the input voltage VIN using the voltage boost clock signal DCCLK having the boost voltage frequency fDCCLK that corresponds to the boost voltage frequency selection signal DC and outputs the input voltage VIN as the output boost voltage VOUT. The voltage boost control unit 150 responds to the result UP/DOWN obtained by comparing levels of the output boost voltage VOUT and the target boost voltage VTAR and changes the boost voltage frequency selection signal DC to output the changed boost voltage frequency selection signal DC.

The voltage boost control unit 150 may include the comparison unit 112 and the up/down counter 117. The comparison unit 112 compares the levels of the output boost voltage VOUT and the target boost voltage VTAR and outputs the comparison result UP/DOWN. According to the comparison result UP/DOWN outputted by the comparison unit 112, the up/down counter 117 increases or decreases the boost voltage frequency selection signal DC in order to output the changed boost voltage frequency selection signal DC. The voltage boost unit 130 may include the voltage boost clock signal generator 119 and the boost voltage generator 135. The voltage boost clock signal generator 119 outputs the voltage boost clock signal DCCLK having the boost voltage frequency fDCCLK that corresponds to the boost voltage frequency selection signal DC. The boost voltage generator 135 responds to the voltage boost clock signal DCCLK and boosts the input voltage VIN so as to output the input voltage VIN as the output boosting voltage VOUT. The voltage boost circuit 100 according to an exemplary embodiment of the present invention may further include a voltage distributor 170. The voltage distributor 170 distributes the output boost voltage VOUT according to a predetermined proportion of R2/(R1+R2) and outputs the distributed output boost voltage R2/(R1+R2)*VOUT.

A voltage boost method 200 according to an exemplary embodiment of the present invention as shown in FIG. 2 includes boost voltage generation (operation S135) and boost voltage frequency control (operations S112, S117, and S119). The operation S135 responds to the voltage boost clock signal in order to boost the input voltage and outputs the input voltage as the output boost voltage. The operations S112, S117, and S119 respond to the result obtained by comparing levels of the output boost voltage and the target boost voltage by changing the voltage boost frequency of the voltage boost clock signal and outputs the voltage boost clock signal having the changed boost voltage frequency.

Boost voltage frequency control operations may include the comparison operation S112, the up/down counting operation S117, and the boost voltage clock generating operation S119. The operation S112 compares the levels of the output boost voltage and the target boost voltage and outputs the comparison result. The operation S117 counts the comparison result and outputs the counting result as a boost voltage frequency selection signal. The operation S119 outputs the voltage boost clock signal having the boost voltage frequency that corresponds to the boost voltage frequency selection signal.

In operation S112, when the output boost voltage is lower than the target boost voltage, the up signal is output as the comparison result, and when the output boost voltage is higher than the target boost voltage, the down signal is output as the comparison result.

In operation S117, when the output boost voltage is lower than the target boost voltage, the up counting operation is performed so as to increase the boost voltage frequency selection signal and the increased boost voltage frequency selection signal is output, and when the output boost voltage is higher than the target boost voltage, the down counting operation is performed so as to decrease the boost voltage frequency selection signal and the decreased boost voltage frequency selection signal is output.

The voltage boosting method 200 of FIG. 2 may further include a voltage distribution. The voltage distribution operation outputs the distributed output boost voltage that distributes the output boost voltage according to a predetermined proportion. In this case, in operation S112, the voltage that distributes the target boost voltage according to a predetermined proportion is compared with the distributed output boost voltage and the comparison result is output.

In operations S112, S117, and S119, when the output boost voltage and the target boost voltage are the same as each other or the difference between the output boost voltage and the target boost voltage is in a fixed range, the boost voltage frequency of the voltage boost clock signal may not be changed.

The voltage boosting method 200 according to an exemplary embodiment of the present invention is the same as the voltage boost circuit 100 in terms of technical concept, and corresponds to the operation of the voltage boost circuit 100 according to an exemplary embodiment of the present invention. Therefore, the voltage boosting method 200 will be understood by those of ordinary skill in the art based on the description above and, thus, a further detailed description of the voltage boosting method 200 will be omitted.

The voltage boost circuit and the voltage boosting method according to an exemplary embodiment of the present invention can prevent waste of operating current during boosting of voltage.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A voltage boost circuit comprising:
a boost voltage generator that responds to a frequency of a voltage boost clock signal in order to boost an input voltage and outputs the boosted input voltage as an output boost voltage;
a boost voltage frequency control unit that responds to a result obtained by comparing a level of the output boost voltage and a level of a target boost voltage in order to change the frequency of the voltage boost clock signal and outputs the voltage boost clock signal having the changed frequency to the boost voltage generator;
a voltage distributor that reduces the output boost voltage by a predetermined proportion; and
a comparison unit that compares levels of the reduced output boost voltage and target voltage that is reduced by the predetermined proportion and produces a comparison result,
wherein the boost frequency control unit changes the frequency of the voltage boost clock signal in response to the comparison result,
wherein the boost voltage frequency control unit comprises:
a voltage boost clock signal output unit that increases or decreases the boost voltage frequency of the voltage boost clock signal according to a result obtained by counting the comparison result, and
wherein the voltage boost clock signal output unit comprises:
an up/down counter that counts the comparison result and outputs the counted result as a boost voltage frequency selection signal; and a voltage boost clock signal generator that outputs the voltage boost clock signal having the frequency that corresponds to the boost voltage frequency selection signal.

2. The voltage boost circuit of claim 1, wherein when the output boost voltage is lower than the target boost voltage, the up/down counter performs an up counting operation to increase the boost voltage frequency selection signal and outputs the increased boost voltage frequency selection, and when the output boost voltage is higher than the target boost voltage, the up/down counter performs down counting operation to decrease the boost voltage frequency selection signal and outputs the decreased boost voltage frequency selection signal.

3. The voltage boost circuit of claim 1, wherein when the output boost voltage is lower than the target boost voltage, the comparison unit outputs an up signal as the comparison result, and when the output boosting voltage is higher than the target boost voltage, the comparison unit outputs a down signal as the comparison result, and
wherein the up/down counter responds to the up signal and the down signal, respectively, in order to respectively increase and decrease the boost voltage frequency selection signal and outputs the increased and decreased boost voltage frequency selection signal.

4. The voltage boost circuit of claim 1, wherein when the output boost voltage and the target boost voltage are the same as each other or a difference between the output boost voltage and the target boost voltage is in a fixed range, the boost voltage frequency control unit does not change the frequency of the voltage boost clock signal.

5. A voltage boost circuit comprising:
a voltage boost unit that boosts an input voltage using a voltage boost clock signal having a frequency that corresponds to a boost voltage frequency selection signal and outputs the input voltage as an output boost voltage;
a voltage boost control unit that responds to a result obtained by comparing levels of the output boost voltage and a target boost voltage and changes the boost voltage frequency selection signal to output a changed boost voltage frequency selection signal fed to the voltage boost unit;
a voltage distributor that reduces the output boost voltage by a predetermined proportion; and
a comparison unit that compares levels of the reduced output boost voltage and target voltage that is reduced by the predetermined proportion and produces a comparison result,
wherein the voltage boost control unit changes the frequency of the voltage boost clock signal in response to the comparison result,
wherein the voltage boost control unit comprises:
an up/down counter that increases or decreases the boost voltage frequency selection signal according to the comparison result and outputs the increased or decreased boost voltage frequency selection signal.

6. The voltage boost circuit of claim 5, wherein when the output boost voltage is lower than the target boost voltage, the up/down counter performs an up counting operation to increase the boost voltage frequency selection signal and outputs the increased boost Voltage frequency selection signal, and when the output boost voltage is higher than the target boost voltage, the up/down counter performs a down counting operation to decrease the boost voltage frequency selection signal and outputs the decreased boost voltage frequency selection signal.

7. The voltage boost circuit of claim 6, wherein when the output boost voltage is lower than the target boost voltage, the comparison unit outputs an up signal as the comparison result, and when the output boost voltage is higher than the target boost voltage, the comparison unit outputs a down signal as the comparison result, and
wherein the up/down counter responds to the up signal and the down signal, in order to respectively increase and decrease the boost voltage frequency selection signal and outputs the increased and decreased boost voltage frequency selection signal.

8. The voltage boost circuit of claim 5, wherein when the output boost voltage and the target boost voltage are the same as each other or a difference between the output boost voltage and the target boost voltage is in a fixed range, the voltage boost control unit does not change the boost voltage frequency selection signal.

9. The voltage boost circuit of claim 5, wherein the voltage boost unit comprises:
a voltage boost clock signal generator that outputs the voltage boost clock signal having the frequency that corresponds to the boost voltage frequency selection signal; and
a boost voltage generator that responds to the frequency of the voltage boost clock signal and boosts the input voltage in order to output the input voltage as the output boost voltage.

10. A method of boosting a voltage comprising:
generating a boost voltage by boosting an input voltage so as to output the input voltage as an output boost voltage in response to a voltage boost clock signal;
changing the boost voltage frequency of the voltage boost clock signal in response to a result obtained by comparing levels of the output boost voltage and a target boost voltage and controlling the boost voltage frequency in order to output the voltage boost clock signal having a changed boost voltage frequency for use in generating the output boost voltage;
reducing the output boost voltage by a predetermined proportion; and
comparing levels of the reduced output boost voltage and target voltage That is reduced by the predetermined proportion and produces a comparison result,
wherein changing the boost voltage frequency includes changing the frequency of the voltage boost clock signal in response to the comparison result,
wherein the controlling of the boost voltage frequency comprises:
outputting a boost voltage clock signal so as to increase or decrease the boost voltage frequency of the voltage boost clock signal according to a result obtained by counting the comparison result, and
wherein the outputting of the boost voltage clock signal comprises:
up/down counting the comparison result and outputting the counted result as the boost voltage frequency selection signal; and
generating the boost voltage clock signal to output the voltage boost clock signal having the boost voltage frequency that corresponds to the boost voltage frequency selection signal.

11. A method of boosting a voltage comprising:
boosting an input voltage in response to a voltage boost clock signal having a boost voltage frequency that corresponds to a boost voltage frequency selection signal and outputting the input voltage as an output boost voltage; and changing the boost voltage frequency selection signal in response to a comparison result obtained by comparing a level of the output boost voltage with a level of target boost voltage and controlling the output boost voltage, wherein the controlling the output boost voltage comprises:

up/down counting the comparison result in order to output the boost voltage frequency selection signal by increasing or decreasing the boost voltage frequency selection signal according to a counted result obtained by an up and counting of the comparison result.

12. The method of claim 11, wherein the boosting of the input voltage comprises:

generating the voltage boost clock signal having the boost voltage frequency that corresponds to the boost voltage frequency selection signal; and generating the output boost voltage by boosting an input voltage so as to output the input voltage as the output boost voltage in response to the voltage boost clock signal.

* * * * *